United States Patent
Ito et al.

(10) Patent No.: US 12,396,389 B2
(45) Date of Patent: Aug. 26, 2025

(54) MOWING DEVICE WITH A ROTARY FAN AND RELATED FEATURES

(71) Applicant: Kubota Corporation, Osaka (JP)

(72) Inventors: Hirokazu Ito, Sakai (JP); Nozomu Akiyama, Sakai (JP)

(73) Assignee: Kubota Corporation, Osaka (JP)

( * ) Notice: Subject to any disclaimer, the term of this patent is extended or adjusted under 35 U.S.C. 154(b) by 778 days.

(21) Appl. No.: 17/344,124

(22) Filed: Jun. 10, 2021

(65) Prior Publication Data

US 2022/0078971 A1    Mar. 17, 2022

(30) Foreign Application Priority Data

Sep. 16, 2020   (JP) ................. 2020-155678

(51) Int. Cl.
  *A01D 34/81*   (2006.01)
  *A01D 34/78*   (2006.01)
  *A01D 34/82*   (2006.01)
  *A01D 69/02*   (2006.01)

(52) U.S. Cl.
  CPC ............ *A01D 34/81* (2013.01); *A01D 34/82* (2013.01); *A01D 69/02* (2013.01); *A01D 34/78* (2013.01)

(58) Field of Classification Search
  CPC ........ A01D 34/81; A01D 34/78; A01D 69/02; A01D 34/82
  See application file for complete search history.

(56) References Cited

U.S. PATENT DOCUMENTS

| | | | | |
|---|---|---|---|---|
| 1,868,918 | A * | 7/1932 | Schenk | A01D 34/78 56/DIG. 8 |
| 3,593,505 | A * | 7/1971 | Mittelstadt | A01D 69/02 56/17.5 |
| 4,838,908 | A * | 6/1989 | Bader | F02B 63/02 123/41.66 |
| 5,638,668 | A * | 6/1997 | Kallevig | A01D 34/81 56/320.1 |
| 8,746,186 | B2 * | 6/2014 | Sullivan | F04D 17/025 123/41.65 |
| 8,769,917 | B1 * | 7/2014 | Howell | A01D 69/02 56/10.8 |
| 11,147,209 | B1 * | 10/2021 | George | A01D 69/02 |
| 11,917,939 | B2 * | 3/2024 | Xu | A01D 34/73 |
| 2012/0227368 | A1 * | 9/2012 | Koike | A01D 69/02 56/10.2 A |
| 2012/0227369 | A1 * | 9/2012 | Koike | B60L 1/003 318/474 |
| 2012/0238403 | A1 * | 9/2012 | Koike | B60L 15/20 477/1 |

(Continued)

FOREIGN PATENT DOCUMENTS

| CA | 3152026 A1 * | 9/2022 | ............. A01D 34/00 |
|---|---|---|---|
| CA | 3152050 A1 * | 9/2022 | ........... A01D 34/006 |

(Continued)

*Primary Examiner* — Joseph M Rocca
*Assistant Examiner* — Ashley A Kaercher
(74) *Attorney, Agent, or Firm* — The Webb Law Firm

(57) ABSTRACT

An electric motor 15 includes a motor section 15b and an output shaft 15a protruding from the motor section 15b. The output shaft 15a supports a rotary fan 24. The rotary fan 24 is drivable by the output shaft 15a to rotate to supply cooling air to the motor section 15b.

7 Claims, 5 Drawing Sheets

(56) References Cited

U.S. PATENT DOCUMENTS

| | | | | |
|---|---|---|---|---|
| 2013/0278093 | A1* | 10/2013 | Baxter | A01D 34/008 310/59 |
| 2014/0053793 | A1 | 2/2014 | Sullivan et al. | |
| 2015/0033693 | A1* | 2/2015 | Ito | A01D 43/063 56/255 |
| 2015/0059309 | A1* | 3/2015 | Jordan | A01D 34/76 56/16.7 |
| 2015/0201556 | A1* | 7/2015 | Ito | A01D 34/006 56/10.2 H |
| 2015/0359170 | A1* | 12/2015 | Ito | A01D 34/78 56/16.9 |
| 2015/0359174 | A1* | 12/2015 | Ito | A01D 34/81 56/16.9 |
| 2016/0183451 | A1* | 6/2016 | Conrad | A01D 34/66 56/10.2 R |
| 2016/0293906 | A1* | 10/2016 | Ito | H01M 10/613 |
| 2016/0295797 | A1* | 10/2016 | Ito | A01D 34/006 |
| 2017/0013780 | A1* | 1/2017 | Ito | A01D 34/81 |
| 2017/0055443 | A1* | 3/2017 | Fujii | A01D 34/66 |
| 2017/0120755 | A1* | 5/2017 | Ito | B60L 3/10 |
| 2017/0135283 | A1* | 5/2017 | Ito | A01D 34/81 |
| 2018/0026244 | A1* | 1/2018 | Ito | B60L 50/64 429/96 |
| 2018/0303027 | A1* | 10/2018 | Koike | B60L 50/51 |
| 2018/0326860 | A1* | 11/2018 | Ito | A01D 34/78 |
| 2018/0338416 | A1* | 11/2018 | Uemura | A01D 34/008 |
| 2018/0338417 | A1* | 11/2018 | Matsuda | A01D 34/006 |
| 2018/0338420 | A1* | 11/2018 | Manji | A01D 34/661 |
| 2019/0014718 | A1* | 1/2019 | Uemura | B60L 50/66 |
| 2019/0111789 | A1* | 4/2019 | Matsuda | B60L 1/003 |
| 2019/0124837 | A1* | 5/2019 | Ito | A01D 69/02 |
| 2019/0380270 | A1* | 12/2019 | Uemura | A01D 43/063 |
| 2019/0381900 | A1* | 12/2019 | Ito | B60K 1/04 |
| 2020/0014320 | A1* | 1/2020 | Ito | B60L 50/51 |
| 2020/0112227 | A1* | 4/2020 | Kouda | H02K 5/08 |
| 2020/0122704 | A1* | 4/2020 | Matsuda | F16D 59/02 |
| 2020/0205343 | A1* | 7/2020 | Ito | A01D 69/02 |
| 2020/0207199 | A1* | 7/2020 | Uemura | B60L 50/50 |
| 2020/0208657 | A1* | 7/2020 | Uemura | F15B 13/08 |
| 2020/0290465 | A1* | 9/2020 | Matsuda | B60K 1/04 |
| 2021/0037707 | A1* | 2/2021 | Matsumoto | H02K 9/06 |
| 2021/0112710 | A1* | 4/2021 | Carmen | A01D 34/006 |
| 2021/0300167 | A1* | 9/2021 | Yamada | A01D 34/78 |
| 2022/0078971 | A1* | 3/2022 | Ito | A01D 34/81 |
| 2022/0080818 | A1* | 3/2022 | Yamada | B60K 1/04 |
| 2022/0174870 | A1* | 6/2022 | Shaffer | A01D 34/71 |
| 2022/0232766 | A1* | 7/2022 | Jiang | A01D 34/008 |
| 2022/0248600 | A1* | 8/2022 | Yamada | A01D 69/02 |
| 2022/0312673 | A1* | 10/2022 | Yamada | A01D 34/78 |
| 2022/0408638 | A1* | 12/2022 | Ito | A01D 34/78 |
| 2023/0062469 | A1* | 3/2023 | Manji | A01D 34/828 |
| 2023/0090301 | A1* | 3/2023 | Yamamoto | B60L 1/006 307/9.1 |
| 2023/0223819 | A1* | 7/2023 | Ro | A01D 34/6806 56/16.9 |

FOREIGN PATENT DOCUMENTS

| | | | | |
|---|---|---|---|---|
| CA | 3152058 | A1* | 9/2022 | A01D 34/006 |
| CN | 1311166 | C* | 4/2007 | |
| CN | 202385497 | U* | 8/2012 | |
| CN | 104641786 | A* | 5/2015 | A01D 34/81 |
| CN | 110771354 | A* | 2/2020 | A01D 34/6806 |
| CN | 110771355 | A* | 2/2020 | A01D 34/003 |
| CN | 111226569 | A* | 6/2020 | |
| CN | 111919581 | A* | 11/2020 | |
| CN | 111492785 | B* | 3/2022 | A01D 34/6818 |
| CN | 116865488 | A* | 10/2023 | |
| DE | 3232895 | A* | 3/1984 | A01D 34/78 |
| DE | 19962365 | A1* | 6/2001 | A01D 42/06 |
| EP | 2374346 | A1* | 10/2011 | A01D 69/02 |
| EP | 2389797 | A2* | 11/2011 | A01D 34/78 |
| EP | 2625947 | A1* | 8/2013 | A01D 34/73 |
| EP | 2656720 | A1* | 10/2013 | A01D 34/008 |
| EP | 2734346 | A1* | 5/2014 | B24B 23/005 |
| EP | 2878189 | A1* | 6/2015 | A01D 34/81 |
| EP | 3076457 | A1* | 10/2016 | A01D 34/64 |
| EP | 3406127 | A1* | 11/2018 | A01D 34/006 |
| EP | 3731376 | A1* | 10/2020 | A01D 34/78 |
| EP | 3741197 | A1* | 11/2020 | A01D 34/66 |
| EP | 3729946 | B1* | 2/2022 | A01D 34/68 |
| EP | 4250541 | A2* | 9/2023 | A01D 34/78 |
| JP | S516070 | U | 1/1976 | |
| JP | S6018581 | Y2* | 6/1985 | |
| JP | 2963627 | B2* | 10/1999 | A01D 43/077 |
| JP | 2002027818 | A* | 1/2002 | |
| JP | 2003154857 | A* | 5/2003 | |
| JP | 2003274726 | A* | 9/2003 | A01D 34/71 |
| JP | 2004267063 | A* | 9/2004 | |
| JP | 2007116956 | A* | 5/2007 | |
| JP | 2008092909 | A* | 4/2008 | A01D 34/76 |
| JP | 2008141977 | A* | 6/2008 | |
| JP | 2010161972 | A* | 7/2010 | A01D 34/71 |
| JP | 2010183868 | A* | 8/2010 | |
| JP | 4546911 | B2* | 9/2010 | A01D 34/71 |
| JP | 3167453 | U* | 4/2011 | |
| JP | 20125367 | A | 1/2012 | |
| JP | 4866617 | B2* | 2/2012 | |
| JP | 2012180779 | A* | 9/2012 | |
| JP | 5596642 | B2* | 9/2014 | A47L 5/22 |
| JP | 2014233255 | A* | 12/2014 | |
| JP | 2015065885 | A* | 4/2015 | |
| JP | 2015092846 | A* | 5/2015 | |
| JP | 5731323 | B2* | 6/2015 | |
| JP | 2015130817 | A* | 7/2015 | |
| JP | 2015188441 | A* | 11/2015 | |
| JP | 20162030 | A | 1/2016 | |
| JP | 2017104142 | A* | 6/2017 | A01D 34/78 |
| JP | 201917278 | A | 2/2019 | |
| JP | 2019017278 | A* | 2/2019 | A01D 34/003 |
| JP | 6509060 | B2* | 5/2019 | A01D 34/73 |
| JP | 2019083710 | A* | 6/2019 | A01D 34/66 |
| JP | 2020104568 | A* | 7/2020 | B60K 1/00 |
| JP | 2020107907 | A* | 7/2020 | B24B 31/062 |
| JP | 2020108213 | A* | 7/2020 | A01D 34/74 |
| JP | 2020108214 | A* | 7/2020 | A01D 34/74 |
| JP | 2020145834 | A* | 9/2020 | |
| JP | 2020150630 | A* | 9/2020 | A01D 34/78 |
| JP | 2020150631 | A* | 9/2020 | A01D 34/78 |
| JP | 2020188713 | A* | 11/2020 | A01D 34/66 |
| JP | 6824097 | B2* | 2/2021 | A01D 34/005 |
| JP | 2022102302 | A* | 7/2022 | |
| JP | 2022189307 | A* | 12/2022 | |
| JP | 2023046857 | A* | 4/2023 | |
| JP | 7378386 | B2* | 11/2023 | |
| WO | WO-9701268 | A1* | 1/1997 | A01D 34/005 |
| WO | WO-2008048618 | A2* | 4/2008 | A01D 34/78 |
| WO | WO-2017214467 | A1* | 12/2017 | A01D 34/64 |
| WO | WO-2019123658 | A1* | 6/2019 | A01D 34/78 |
| WO | WO-2021024399 | A1* | 2/2021 | A01D 34/6806 |
| WO | WO-2023030296 | A1* | 3/2023 | |

* cited by examiner

MOWING DEVICE WITH A ROTARY FAN AND RELATED FEATURES

CROSS REFERENCE TO RELATED APPLICATION

This application claims priority to Japanese Patent Application No. 2020-155678 filed Sep. 16, 2020, the disclosure of which is hereby incorporated by reference in its entirety.

BACKGROUND OF THE INVENTION

1. Field of the Invention

The present invention relates to a mowing device.

2. Art Description of Related Art

A mowing device may include a cutting blade housing and cutting blades present inside the cutting blade housing and drivable to rotate. An example of such a mowing device is the mower unit disclosed in Patent Literature 1. The mower unit includes a "mower deck" as the cutting blade housing and "blades" as the cutting blades. A mowing device of this type may include, as disclosed in Patent Literature 1, an electric motor ("work motor" in Patent Literature 1) supported by the cutting blade housing and configured to drive the cutting blades.

Patent Literature 1

Japanese Unexamined Patent Application Publication, Tokukai, No. 2019-17278

SUMMARY OF THE INVENTION

The above mowing device will become unable to continue work if the electric motor has been driven and heated up so much as to seize up.

The present invention has an object of providing an inexpensive mowing device configured to drive a cutting blade with use of an electric motor and yet capable of continuing mowing work over an extended period of time.

A mowing device as an embodiment of the present invention includes: a cutting blade housing; a cutting blade present inside the cutting blade housing and drivable to rotate; and an electric motor supported by the cutting blade housing and configured to drive the cutting blade, wherein the electric motor includes: a motor section; and an output shaft protruding from the motor section, and the mowing device further includes a rotary fan supported by the output shaft and drivable by the output shaft to rotate to supply cooling air to the motor section.

The above arrangement allows the rotary fan to be driven by the electric motor to supply cooling air to the motor section and cool the motor section. This prevents the electric motor from becoming heated up excessively, and thereby prevents the electric motor from becoming broken down. The above arrangement, in other words, allows the mowing device to continue mowing work over an extended period of time. Further, the simple structure of the rotary fan being supported by the output shaft allows production of an inexpensive mowing device.

A mowing device as a preferable embodiment of the present invention includes: a fan cover covering the rotary fan and having a vent hole, wherein the rotary fan supplies the cooling air to the motor section by taking in the cooling air from outside the fan cover through the vent hole, and the rotary fan includes a cutter section configured to cut a foreign object having entered the fan cover through the vent hole.

The above arrangement allows the cutter section to cut a foreign object such as mown grass having entered the fan cover. Such a foreign object and/or the like is thus cut to shreds and easily discharged from the fan cover with use of, for example, cooling air. The above arrangement thereby prevents a foreign object and/or the like having entered the fan cover from remaining on, for example, the motor section to prevent the cooling effect from becoming decreased and more reliably prevent the electric motor from becoming heated up excessively.

A mowing device as a preferable embodiment of the present invention is arranged such that the motor section includes a cooling fin section configured to dissipate heat of the motor section, and the cooling fin section receives the cooling air supplied by the rotary fan.

The above arrangement allows heat of the motor section to be conducted to the cooling fin section and then dissipated by means of the cooling fin section. The above arrangement also promotes dissipation of heat from the cooling fin section due to cooling air that the rotary fan supplies to the cooling fin section. The above arrangement thereby cools the motor section effectively. This more reliably prevents the electric motor from becoming heated up excessively, and thereby effectively prevents the electric motor from becoming broken down.

A mowing device as a preferable embodiment of the present invention is arranged such that the cooling fin section includes a plurality of linear fins present around the output shaft in a plan view.

The above arrangement involves linear fins present over a wide area around the motor section in a plan view. This allows the electric motor to be cooled more effectively through heat dissipation by the cooling fin section.

A mowing device as a preferable embodiment of the present invention is arranged such that the plurality of linear fins extend radially from the output shaft.

The above arrangement allows cooling air supplied by the rotary fan to the cooling fin section to flow along the plurality of linear fins from the output shaft side to the opposite side. This promotes heat dissipation by the cooling fin section, and thereby allows the electric motor to be cooled more effectively.

A mowing device as a preferable embodiment of the present invention includes: an output pulley which is present on the output shaft and between the rotary fan and the motor section and around which a power transmission belt is wound, the power transmission belt interlocking the output shaft and the cutting blade with each other.

The above arrangement allows cooling air supplied from the rotary fan toward the motor section to be brought to the output pulley, meaning that the rotary fan is usable also as a means of cooling the output pulley. This simple structure prevents the output pulley and the power transmission belt from becoming heated up.

A mowing device as a preferable embodiment of the present invention is arranged such that the output pulley and the plurality of linear fins coincide with each other with respect to an axial direction of the output shaft.

The above arrangement allows the rotary fan to be near both the linear fins and the output pulley. This allows the rotary fan to supply cooling air to the linear fins and the output pulley in such a manner as to cool the linear fins and the output pulley effectively.

A mowing device as a preferable embodiment of the present invention is arranged such that the output shaft protrudes upward from the motor section.

The above arrangement allows the rotary fan to be above the motor section. This allows cooling air to be taken in from above the cutting blade housing, and prevents, for example, mown grass from entering the motor section easily.

DETAILED DESCRIPTION OF THE PREFERRED EMBODIMENTS

The description below deals with an example embodiment of the present invention with reference to drawings.

Figure 1:
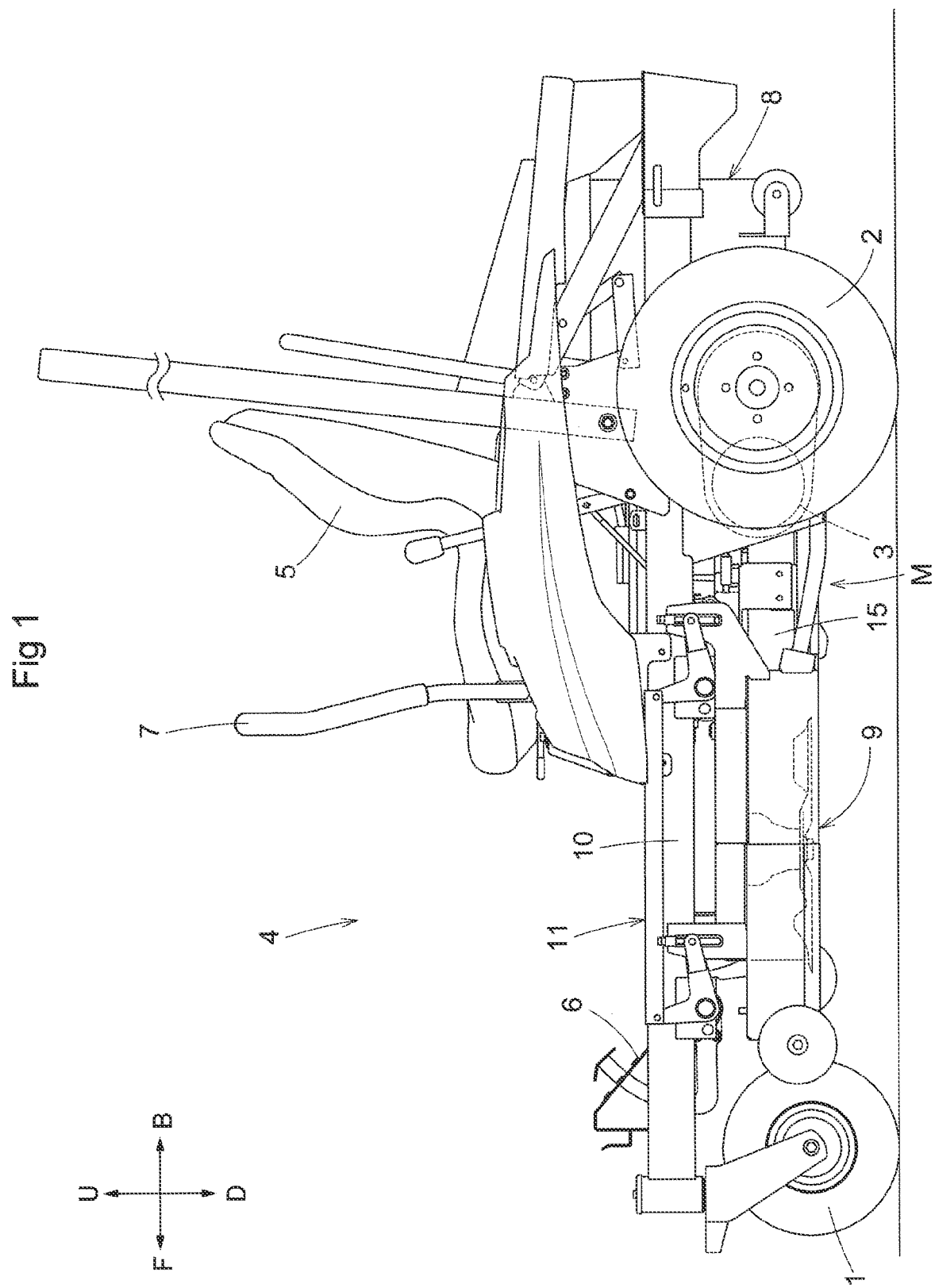
FIG. 1 is a left side view of a riding type mower as a whole.

The embodiment described below is a riding-type mower including a travel vehicle body. FIG. 1 shows arrow F to indicate the forward direction of the vehicle body, arrow B to indicate the backward direction of the vehicle body, arrow U to indicate the upward direction of the vehicle body, and arrow D to indicate the downward direction of the vehicle body. The front side of the drawing corresponds to the leftward direction of the vehicle body, whereas the back side of the drawing corresponds to the rightward direction of the vehicle body.

[Overall Configuration of Riding-Type Mower]

As illustrated in FIG. 1, the riding-type mower includes a travel vehicle body provided with a pair of left and right freely rotatable front wheels 1 and a pair of left and right drivable rear wheels 2. The pair of left and right front wheels 1 are each a caster wheel. The pair of left and right rear wheels 2 are drivable by a pair of left and right travel electric motors 3, respectively. The riding-type mower includes a driver section 4 at a front portion of the travel vehicle body. The driver section 4 includes a driver's seat 5, a driver section floor 6 present in front of and below the driver's seat 5, and a pair of left and right control levers 7 present to the left and right of the driver's seat 5 and operable to move and steer the travel vehicle body. The driver can move and steer the travel vehicle body with use of the left and right control levers 7 by swinging the left and right control levers 7 individually in the front-back direction to change the respective rotation directions and rotation speeds of the left and right travel electric motors 3 by means of respective linkage mechanisms (not shown in the drawings) between the left and right control levers 7 and the left and right travel electric motors 3. The riding-type mower includes a battery pack 8 present at a back portion of the travel vehicle body and configured to supply electric power to, for example, the travel electric motors 3. The riding-type mower includes, between the front wheels 1 and the rear wheels 2, a mowing device 9 configured to mow turf and grass and discharge mown turf and grass (hereinafter referred to simply as "mown grass") laterally outward of the vehicle body. The mowing device 9 is supported by a vehicle body frame 10 via a link mechanism 11 configured to allow the mowing device 9 to be lifted and lowered relative to the vehicle body frame 10.

[Configuration of Mowing Device]

Figure 2:
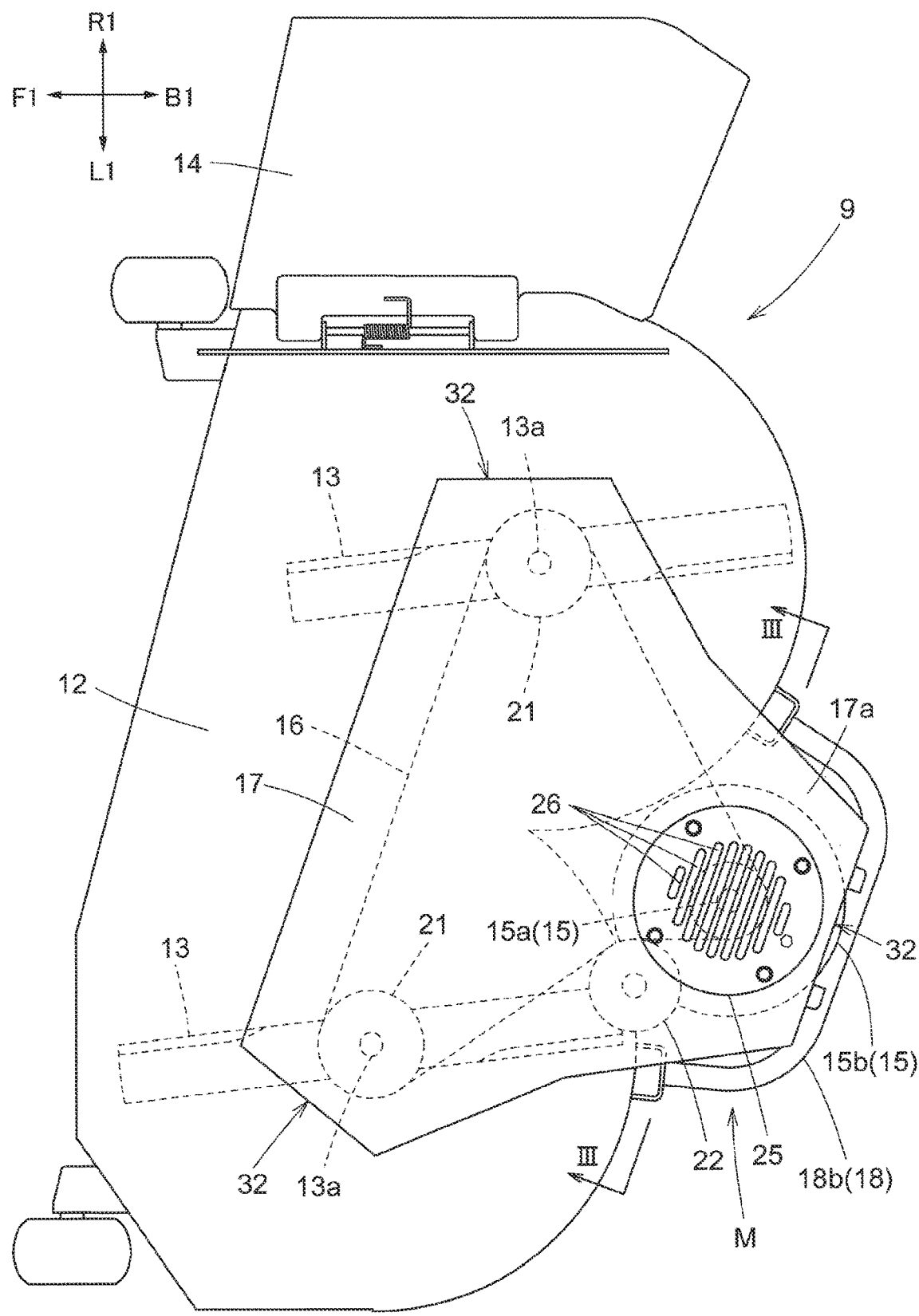
FIG. 2 is a plan view of a mowing device as a whole.

FIG. 2 is a plan view of the mowing device 9 as a whole. The description below of the mowing device 9 refers to FIG. 2, which shows arrow F1 to indicate the forward direction of the device, arrow B1 to indicate the backward direction of the device, arrow L1 to indicate the leftward direction of the device, and arrow R1 to indicate the rightward direction of the device. The mowing device 9 is oriented so that its front-back direction is identical to the front-back direction of the travel vehicle body.

As illustrated in FIG. 2, the mowing device 9 includes a cutting blade housing 12 and two cutting blades 13 present inside the cutting blade housing 12 and drivable to rotate. The cutting blades 13 are arranged next to each other in the left-right direction of the device. The cutting blades 13 are each in the shape of a blade, and are each supported by the cutting blade housing 12 via a rotary shaft 13a extending in the up-down direction of the device. The mowing device 9 includes, to the right of the cutting blade housing 12, a discharge guide 14 connected to the cutting blade housing 12 and configured to guide mown grass discharged from the cutting blade housing 12 toward a lateral side of the vehicle body. The mowing device 9 includes a motor device M supported by a back portion of the cutting blade housing 12 and including an electric motor 15 configured to drive the cutting blades 13. The mowing device 9 includes, on an upper surface side of the cutting blade housing 12, (i) a power transmission belt 16 configured to transmit power from the electric motor 15 to the cutting blades 13 and (ii) a power transmission section cover 17 covering, for example, the power transmission belt 16. The power transmission section cover 17 includes a back portion 17a covering the motor device M.

[Configuration of Motor Device]

Figure 3:
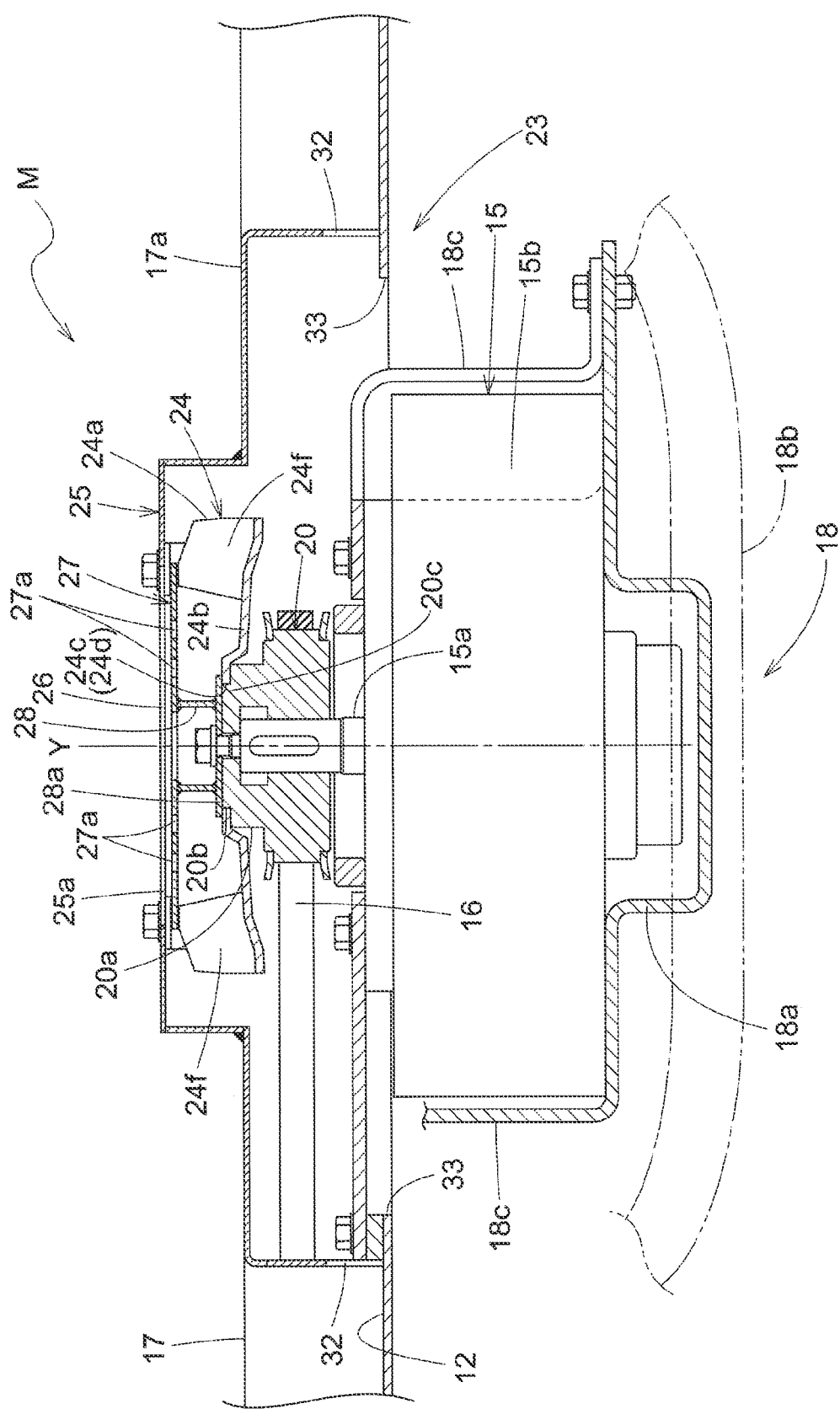
FIG. 3 is a cross-sectional view of the mowing device taken along line III-III in FIG. 2.

As illustrated in FIGS. 2 and 3, the motor device M includes an electric motor 15 present under the back portion 17a of the power transmission section cover 17 and configured to drive the cutting blades 13. The electric motor 15 includes a motor section 15b including, for example, a rotor and an output shaft 15a protruding from the motor section 15b. The motor section 15b is, as illustrated in FIG. 2, in the shape of a circle with the output shaft 15a as its center in a plan view. The output shaft 15a, as illustrated in FIG. 3, protrudes upward from the motor section 15b. The motor section 15b includes a front portion between (i) an arc-shaped back portion of that part of the cutting blade housing 12 which contains the left cutting blade 13 and (ii) an arc-shaped back portion of that part of the cutting blade housing 12 which contains the right cutting blade 13.

The electric motor 15 is attached to a motor support 18 extending backward from a back portion of the cutting blade housing 12. The electric motor 15 is thereby supported by the cutting blade housing 12 via the motor support 18. The motor support 18, as illustrated in FIGS. 2 and 3, includes (i) a motor mount section 18a which extends backward from the cutting blade housing 12 and on which the motor section 15b is mounted, (ii) a connecting bar section 18b connecting a back portion of the motor mount section 18a to the cutting blade housing 12, and (iii) an upper support section 18c extending from the motor mount section 18a to a height above the motor section 15b and supporting an upper portion of the motor section 15b from above.

As illustrated in FIGS. 2 and 3, the motor device M includes an output pulley 20 on the output shaft 15a. The motor device M includes a power transmission belt 16 wound around the output pulley 20 and cutting blade drive pulleys 21 each present on the rotary shaft 13a of the corresponding cutting blade 13. The cutting blade drive pulleys 21 are each present on that portion of the corresponding rotary shaft 13a which protrudes upward from the cutting blade housing 12. As illustrated in FIG. 2, the power transmission belt 16 is wound around a guide wheel 22 between the left cutting blade drive pulley 21 and the output pulley 20. The guide wheel 22 is supported by the cutting blade housing 12.

The motor device M is configured such that the electric motor 15 transmits power from the output shaft 15a to each cutting blade drive pulley 21 via the power transmission belt 16 and that each cutting blade drive pulley 21 then transmits power to the corresponding cutting blade 13 via its rotary shaft 13a, whereby the electric motor 15 drives the cutting blades 13.

[Configuration of Motor Cooling Mechanism]

The motor device M is, as illustrated in FIG. 3, provided with a motor cooling mechanism 23 configured to cool the electric motor 15 so that the electric motor 15 is drivable continuously over an extended period of time.

The motor cooling mechanism 23, as illustrated in FIG. 3, includes a rotary fan 24 configured to cool the electric motor 15. The rotary fan 24 is supported by the output shaft 15a in such a manner as to be drivable by the output shaft 15a to rotate. Specifically, as illustrated in FIG. 3, the rotary fan 24 includes a fan section 24a and a connecting section 24b inside the fan section 24a. The fan section 24a includes blower fins 24f arranged apart from each other along the circumference of the rotary fan 24. The connecting section 24b has an attachment hole 24c at a central portion thereof. The output pulley 20 is provided with a fan support section 20a protruding upward from a side portion of the output pulley 20. The connecting section 24b is fitted around an upper end portion 20b of the fan support section 20a with the upper end portion 20b in the attachment hole 24c. The connecting section 24b includes a depressed portion 24d in an inner circumferential portion thereof, whereas the upper end portion 20b includes a protruding portion 20c fitted in the depressed portion 24d. The connecting section 24b and the fan support section 20a are thereby engaged with each other in such a manner as to be incapable of rotation relative to each other. The rotary fan 24 is supported by the output shaft 15a via the output pulley 20. The rotary fan 24 and the output shaft 15a are connected to each other via the output pulley 20 in an interlocking manner, so that the output shaft 15a is capable of driving the rotary fan 24 to rotate.

As illustrated in FIG. 3, the output pulley 20 is present on the output shaft 15a between the rotary fan 24 and the motor section 15b.

As illustrated in FIGS. 2 and 3, the motor device M includes a fan cover 25 that surrounds and covers the rotary fan 24. The fan cover 25 protrudes upward from the back portion 17a of the power transmission section cover 17. The fan cover 25 includes a top plate portion 25a having a plurality of vent holes 26 that allow the fan cover 25 to take in cooling air from outside. The vent holes 26 are each in the shape of a slit for the present embodiment, but are not limited as such. The vent holes 26 may alternatively each have any of various shapes such as a circle, a rectangle, or an ellipse. As illustrated in FIGS. 2 and 3, the power transmission section cover 17 has, at an edge portion thereof, a plurality of exhaust ports 32 that allow air from the rotary fan 24 to be discharged.

As illustrated in FIG. 3, the rotary fan 24 includes a cutter section 27 configured to cut a foreign object such as mown grass having entered the fan cover 25. The cutter section 27 is in the form of a circular screen, and is present at an upper end portion of the rotary fan 24 in such a manner as to face the top plate portion 25a of the fan cover 25. The cutter section 27 has a plurality of through holes 27a. The cutter section 27 is provided with a connecting cylindrical portion 28 extending from a central portion of the cutter section 27 toward the fan support section 20a. The connecting cylindrical portion 28 includes, at a lower end portion thereof, a flange portion 28a placed on the connecting section 24b of the rotary fan 24 and fastened to the fan support section 20a with use of a connecting bolt. The cutter section 27 is thus supported by the rotary fan 24 in such a manner as to be incapable of rotation relative to the rotary fan 24. The flange portion 28a serves to prevent the rotary fan 24 from becoming detached from the fan support section 20a. The through holes 27a are each in the shape of a circle for the present embodiment, but are not limited as such. The through holes 27a may alternatively each have any of various shapes such as a slit, a rectangle, or an ellipse. If a foreign object enters the fan cover 25 through a vent hole 26 to have one end in a through hole 27a and the other end in the vent hole 26, the foreign object is caught by the top plate portion 25a and the cutter section 27. In this state, the cutter section 27 is rotated relative to the top plate portion 25a to cut the foreign object.

The motor cooling mechanism 23 is arranged such that the rotary fan 24 is drivable by the electric motor 15 to rotate about the axis Y of the output shaft 15a. The rotation of the rotary fan 24 takes in cooling air from outside the fan cover 25 through the vent holes 26. The cooling air flows from an inner portion of the rotary fan 24 through a space between the blower fins 24f to a space around the rotary fan 24. The cooling air is then partly supplied to the output pulley 20 to cool the output pulley 20 and the power transmission belt 16. The cooling air having flown to the space around the rotary fan 24 is also partly supplied to the motor section 15b through the upper support section 18c or directly to the motor section 15b past a space in which the upper support section 18c is absent. The cooling air thereby cools the motor section 15b. Cooling air having entered the power transmission section cover 17 flows through the exhaust ports 32 or openings 33 in the cutting blade housing 12 to outside the power transmission section cover 17. If the motor device M has taken cooling air into the fan cover 25 together with a foreign object such as mown grass through a vent hole 26, the cutter section 27 shreds the foreign object. The motor device M discharges the shredded foreign object together with cooling air.

[Alternative Embodiments]

Figure 4:
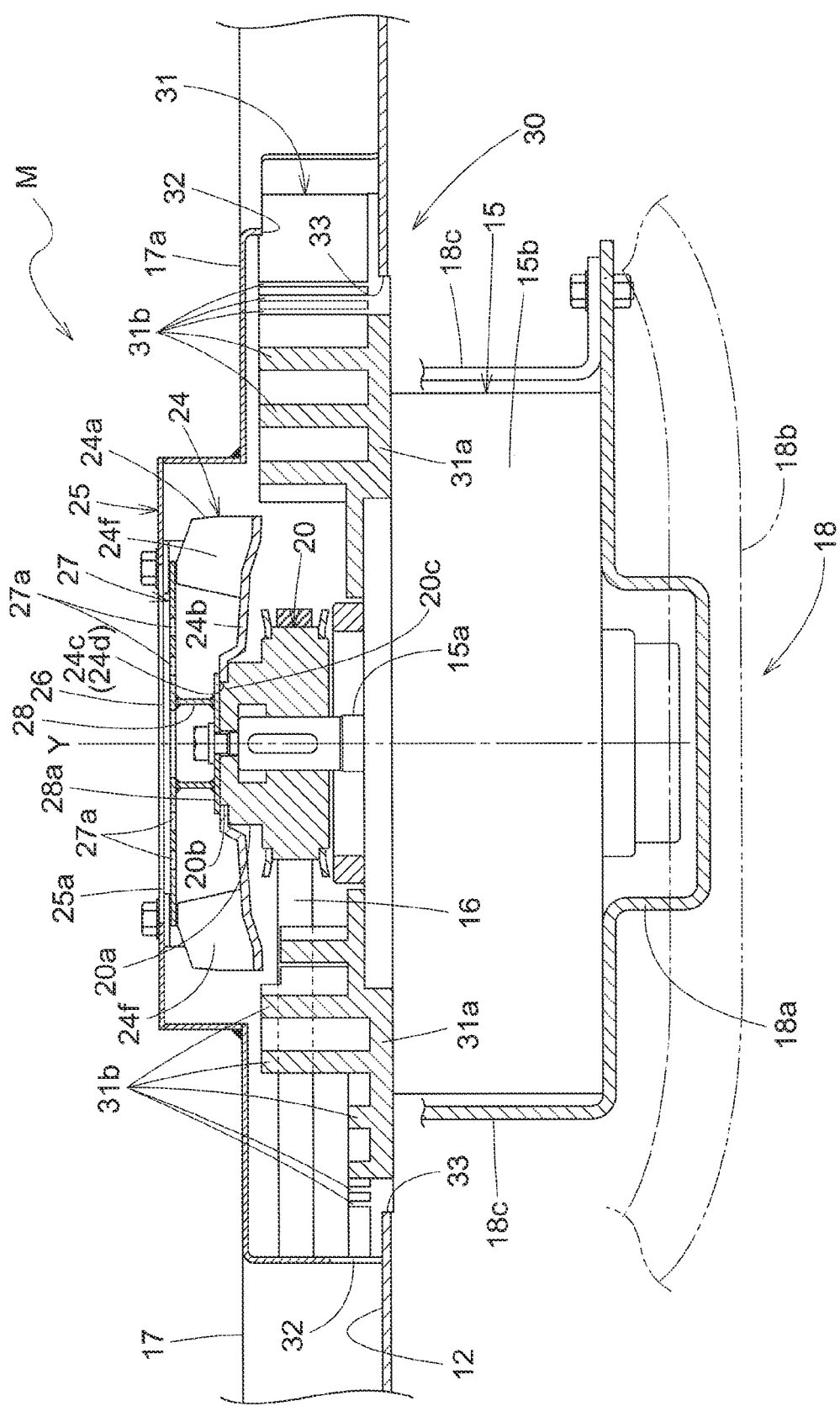
FIG. 4 is a cross-sectional view of a motor cooling mechanism for an alternative embodiment.

(1) FIG. 4 is a cross-sectional view of a motor cooling mechanism 30 for an alternative embodiment. The motor cooling mechanism 30 for an alternative embodiment includes a rotary fan 24, and also includes a cooling fin section 31 for the motor section 15b.

Figure 5:
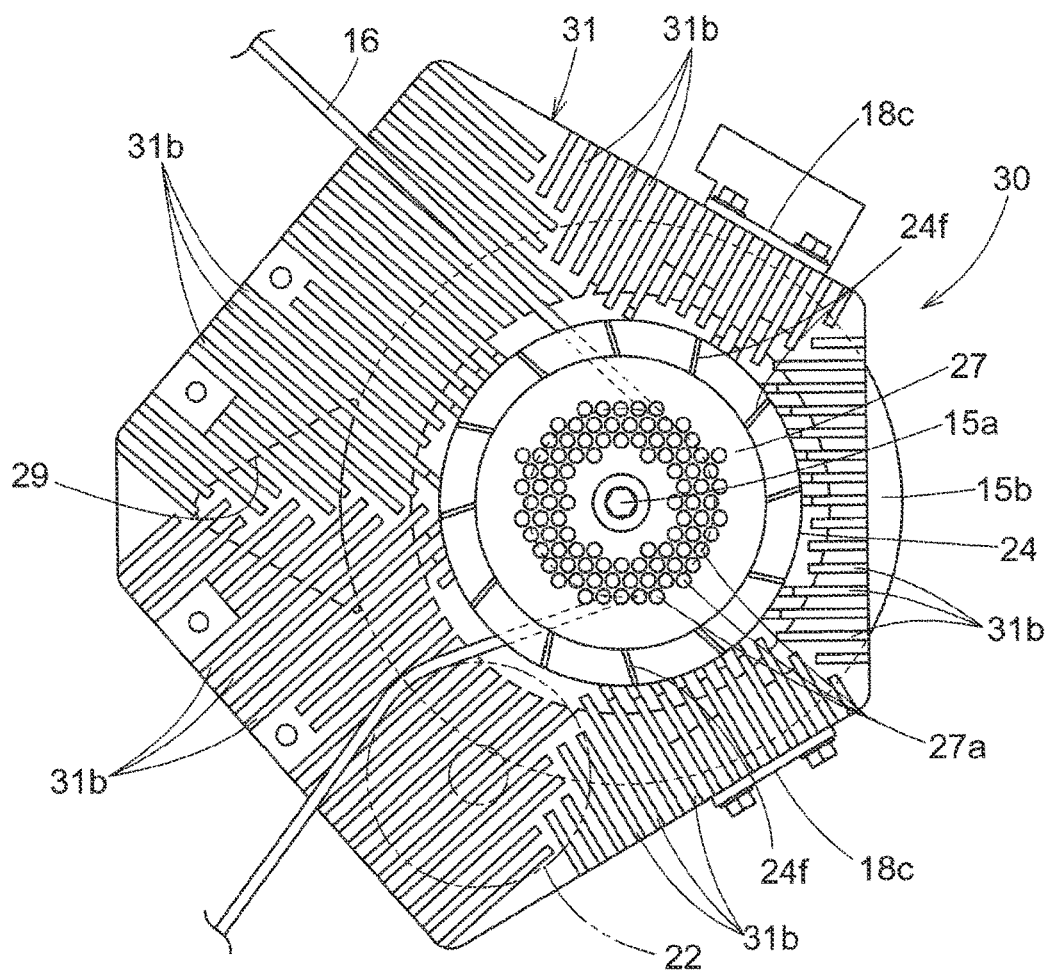
FIG. 5 is a plan view of a motor cooling mechanism for an alternative embodiment.

As illustrated in FIGS. 4 and 5, the cooling fin section 31 receives heat from the motor section 15b through heat transfer involving contact with the motor section 15b and heat transfer involving no contact with the motor section 15b. The cooling fin section 31 also dissipates heat that it has received. The cooling fin section 31 is oriented to face the rotary fan 24 to receive cooling air from the rotary fan 24.

The cooling fin section 31 is mounted over the motor section 15b. The upper support section 18c is connected to the cooling fin section 31 and the motor mount section 18a. The cooling fin section 31 is pressed by the upper support section 18c against the motor section 15b, so that the cooling fin section 31 serves to fix the electric motor 15 to the motor mount section 18a.

The cooling fin section 31, as illustrated in FIGS. 4 and 5, includes a mount section 31a placed on and connected to the motor section 15b and a plurality of linear fins 31b protruding upward from the mount section 31a. The linear fins 31b are each, for example, a plate-shaped fin standing on the mount section 31a. The linear fins 31b each have a predetermined height and a predetermined thickness in a plan view. The linear fins 31b are, however, not limited as such, and may each be a member having any shape with a predetermined surface area and supported by the mount section 31a. The plurality of linear fins 31b are, as illustrated in FIG. 5, arranged around the output shaft 15a in a pattern similar to a radial pattern with the output shaft 15a as the center. The mount section 31a has, at a portion forward of the motor section 15b, a through hole 29 that allows air to pass therethrough. The through hole 29 is, as illustrated in FIG. 5, in the shape of a substantial triangle in a plan view. As illustrated in FIG. 4, those linear fins 31b which are under the power transmission belt 16 each protrude from the mount section 31a to a height smaller than the height to which each of the other linear fins 31b protrudes from the mount section 31a.

As illustrated in FIG. 4, the output pulley 20 and the plurality of linear fins 31b coincide with each other with respect to the axial direction of the output shaft 15a. This allows the rotary fan 24 to be near both the linear fins 31b and the output pulley 20.

The motor cooling mechanism 30 is configured such that heat generated by the motor section 15b is conducted to the cooling fin section 31 and is then dissipated by the linear fins 31b, whereby the cooling fin section 31 cools the electric motor 15. The rotary fan 24 takes in cooling air from outside the fan cover 25. The cooling air flows through a space around the rotary fan 24, and is supplied to the cooling fin section 31. The cooling air then flows along the plurality of linear fins 31b from the output shaft side (that is, the side close to the output shaft 15a) toward the opposite side (that is, the side far from the output shaft 15a). This allows the cooling air to cool the linear fins 31b and promote heat dissipation by the linear fins 31b. The cooling air having flown along the linear fins 31b toward the opposite side flows through the exhaust ports 32 and the openings 33 to be discharged from the power transmission section cover 17.

Figure 6:
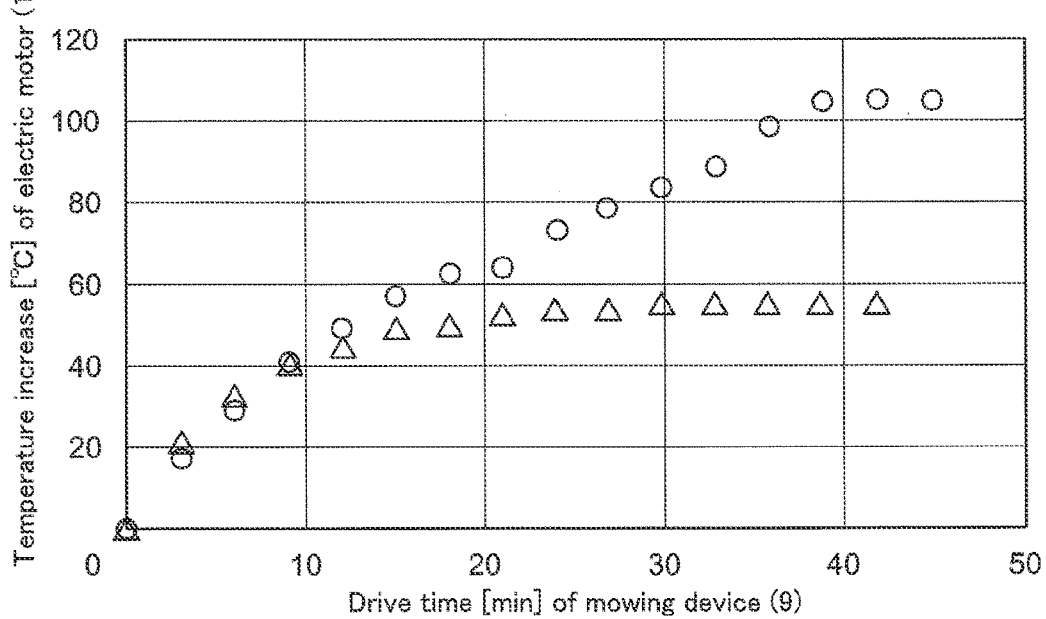
FIG. 6 is a graph that shows a change in the temperature of the electric motor of a mowing device which change is caused as the mowing device is driven idly.

FIG. 6 is a graph that shows the result of a test on a change in the temperature of the electric motor 15 of a mowing device 9 including the cooling fin section 31 and the rotary fan 24 which change is caused as the mowing device 9 is driven idly. The graph has (i) a horizontal axis indicative of the time length over which the mowing device 9 is driven idly and (ii) a vertical axis indicative of the increase in the temperature of the electric motor 15. The temperature increase is a difference between the temperature of the electric motor 15 and that of outside air. The graph shows (i) circles to indicate a temperature change for a case involving no cooling fin section 31 or rotary fan 24 and (ii) triangles to indicate a temperature change for a case involving the cooling fin section 31 and the rotary fan 24.

(2) The embodiment described above is arranged such that the output shaft 15a protrudes upward from the motor section 15b and that the output pulley 20 and the rotary fan 24 are present above the motor section 15b. The embodiment may, however, be altered such that the output shaft 15a protrudes downward from the motor section 15b and that the output pulley 20 and the rotary fan 24 are present below the motor section 15b.

(3) The embodiment described above is an example in which the linear fins 31b are arranged in a pattern similar to a radial pattern with the output shaft 15a as the center. The present invention is, however, not limited to such an arrangement. The embodiment may be altered to include, for example, (i) linear fins extending in the left-right direction of the cutting blade housing 12 and arranged next to one another in the front-back direction of the cutting blade housing 12 or (ii) linear fins extending in the front-back direction of the cutting blade housing 12 and arranged next to another in the left-right direction of the cutting blade housing 12.

(4) The embodiment described above is an example in which the output pulley 20 and the linear fins 31b coincide with each other with respect to the axial direction of the output shaft 15a. The present invention is, however, not limited to such an arrangement. The embodiment may be altered, for instance, such that the linear fins 31b are above or below the output pulley 20.

INDUSTRIAL APPLICABILITY

The present invention is applicable to a mowing device including a cutting blade housing, cutting blades present inside the cutting blade housing and drivable to rotate, and an electric motor supported by the cutting blade housing and configured to drive the cutting blades.

REFERENCE SIGNS LIST

12 Cutting blade housing
13 Cutting blade
15 Electric motor
15a Output shaft
15b Motor section
16 Power transmission belt
20 Output pulley
24 Rotary fan
25 Fan cover
26 Vent hole
27 Cutter section
31 Cooling fin section
31b Linear fin

The invention claimed is:
1. A mowing device, comprising:
a cutting blade housing;
a cutting blade present inside the cutting blade housing and drivable to rotate; and
an electric motor supported by the cutting blade housing and configured to drive the cutting blade, wherein the electric motor comprises:
a motor section; and
an output shaft protruding from the motor section, and
wherein the mowing device further comprises:
a rotary fan supported by the output shaft and drivable by the output shaft to rotate to supply cooling air to the motor section;
a fan cover covering the rotary fan;
at least one vent hole formed in the fan cover; and
a circular cutter section disposed between the rotary fan and the fan cover, connected to the rotary fan, supported by the rotary fan in such a manner as to be incapable of rotation relative to the rotary fan, rotated relative to the fan cover, and centered on an axis of the output shaft;

wherein the cutter section comprises a circular screen and at least one circular through hole provided in the circular screen, wherein the rotary fan supplies the cooling air to the motor section by taking in the cooling air from outside the fan cover through the at least one vent hole, and wherein the cutter section is rotated relative to the fan cover to cut a foreign object, one end of the foreign object having entered the circular through hole and another end of the foreign object existing in the at least one vent hole.

2. The mowing device according to claim 1, wherein:

the motor section comprises a cooling fin section configured to dissipate heat of the motor section, and the cooling fin section receives cooling air supplied by the rotary fan.

3. The mowing device according to claim 2, wherein the cooling fin section comprises a plurality of linear fins present around the output shaft in a plan view.

4. The mowing device according to claim 3, wherein the plurality of linear fins extend radially from the output shaft.

5. The mowing device according to claim 3, further comprising:

an output pulley which is present on the output shaft and between the rotary fan and the motor section and around which a power transmission belt is wound, the power transmission belt interlocking the output shaft and the cutting blade with each other.

6. The mowing device according to claim 5, wherein the output pulley and the plurality of linear fins coincide with each other with respect to an axial direction of the output shaft.

7. The mowing device according to claim 1, wherein the output shaft protrudes upward from the motor section.

* * * * *